Jan. 18, 1927.  
E. J. LEACH ET AL  
1,614,563  
PROCESS OF MAKING BELLOWS  
Filed Feb. 28, 1925  
2 Sheets-Sheet 1

Inventors  
Edgar J. Leach  
Walter G. Lagerman  
By Frank E. Liverance, Jr.  
Attorney.

Jan. 18, 1927.                                                       1,614,563
E. J. LEACH ET AL
PROCESS OF MAKING BELLOWS
Filed Feb. 28, 1925          2 Sheets-Sheet 2
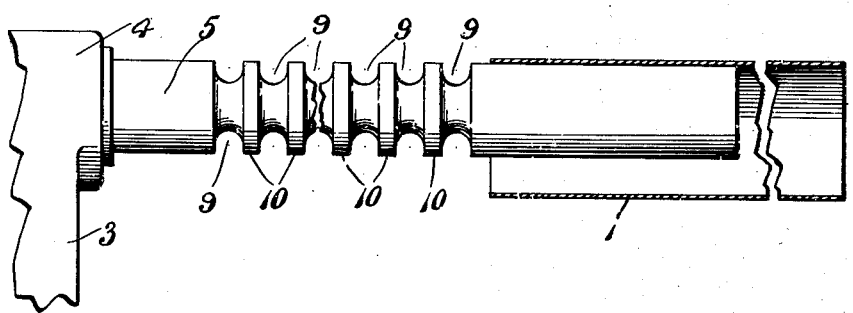
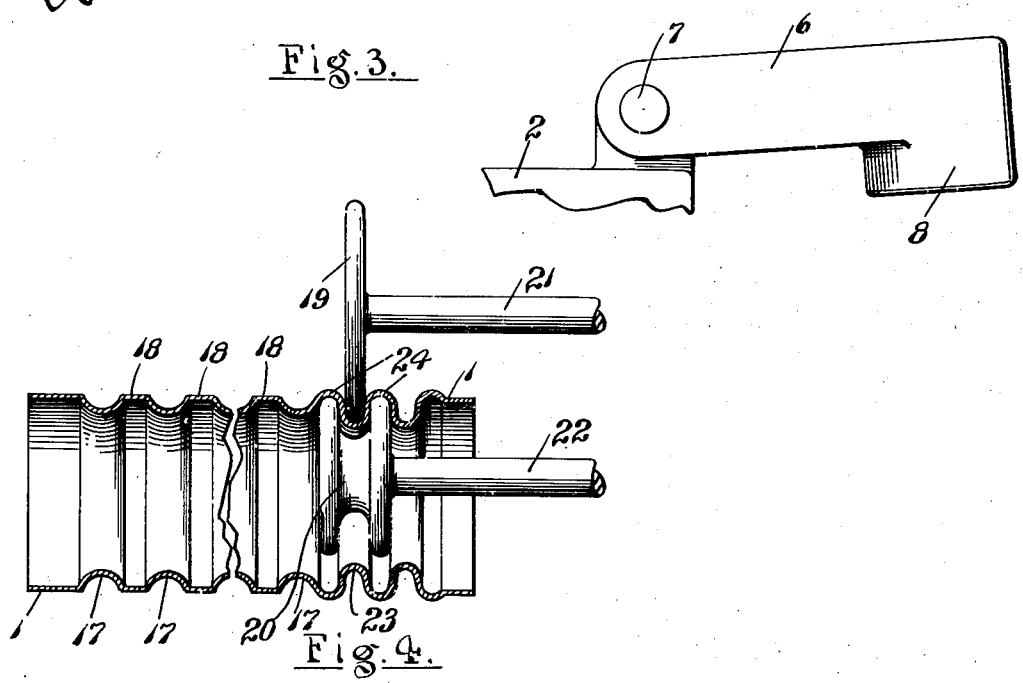
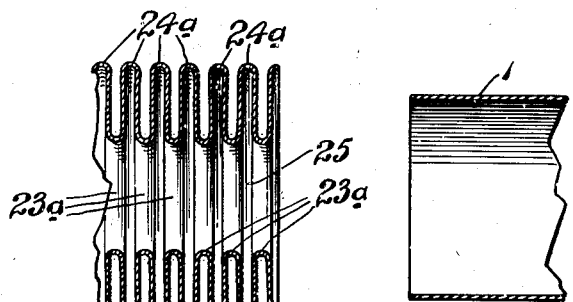   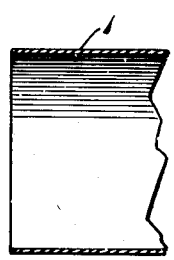
Inventors
Edgar J. Leach
Walter C. Lagerman
By Frank E. Liverance Jr.
Attorney.

Patented Jan. 18, 1927.

1,614,563

UNITED STATES PATENT OFFICE.

EDGAR J. LEACH AND WALTER C. LAGERMAN, OF JANESVILLE, WISCONSIN.

PROCESS OF MAKING BELLOWS.

Application filed February 28, 1925. Serial No. 12,418.

This invention relates to a process of making bellows or flexible corrugated longitudinal expansible and collapsible metal walls which may be used for many different purposes.

The process which we have devised is concerned with making bellows and in such manner that by merely varying the annealing of the same between its stages of formation, bellows can be obtained adapted for many different and varied uses, whether it is to be subjected to mild or very severe usage and this without changing, altering or modifying any of the formative steps of the process.

Bellows of this character when used for pumps in internal combustion engines must be capable of longitudinally expanding and contracting many hundreds of thousands or, perhaps, millions of times during the life of an automobile on which it is installed. We have found by repeated tests and experiments that bellows of this character subjected to elongation and retraction in the direction of its length fails by rupture of the metal at an inner corrugation. We have heretofore produced bellows in which the number of elongations and retractions before failure has been greatly increased by making the bellows with the inner corrugations considerably tempered by cold working the metal, that is, by operating on the metal at such points and bending and stretching it beyond its elastic limit. The metal used, preferably, is brass readily worked and tempered while cold.

The outer corrugations of the bellows do not require as high a temper, as failure of the bellows at such points does not take place under alternate longitudinal elongation and contraction, but the failure takes place at the inner corrugations.

The present invention is directed to a method wherein a plain tube of brass, or similar metal capable of acquiring a temper under cold working beyond its elastic limit, is first provided with spaced apart annular grooves pressed inwardly in the tube toward the axis of said tube and around the same in planes transverse to its longitudinal axis, with the alternate connecting portions between said grooves remaining at the same diameter as the plain tube used for the production of the bellows. This plain tube is of thin metal and prior to any operation thereon is thoroughly annealed so that it is in soft and pliable condition. At the end of the first operation upon the tube, the metal in the grooves having been stretched and bent and worked beyond its elastic limit has acquired temper while the connecting portions remaining exactly as they were in the beginning are still soft and pliable and have no temper whatever. With succeeding operations performed upon the grooved tube, said grooves are worked inwardly, made deeper and narrower and the connecting portions between the grooves are worked outwardly somewhat and narrowed and deepened but having been subjected to much less cold working than the inner corrugations, said inner corrugations are tempered to a higher degree than the outer corrugations.

For an understanding of the invention and one way in which it can be performed, reference may be had to the following description and accompanying drawings illustrative of mechanism which may be used, in which drawings, Fig. 1 is an elevation showing a rolling machine by means of which the inwardly pressed annular grooves are formed in a plain tube in spaced apart relation to each other;

Fig. 3 is a fragmentary elevation of the lower roller or mandrel of said machine showing the pivoted end support thereof moved out of the way for the passage of the plain tube over said mandrel, said tube being shown in longitudinal section;

Fig. 4 is a view partly in longitudinal section and partly in elevation showing succeeding steps of the method for finishing the grooved tube to a bellows;

Fig. 5 is a fragmentary longitudinal vertical section through a completed bellows; and

Fig. 6 is a fragmentary longitudinal vertical section through the tube from which the bellows is made, the bellows shown in Fig. 5 being approximately the size which will be formed from a tube having a diameter of the tube shown in Fig. 6.

Like reference characters refer to like parts in the different figures of the drawings.

Figure 1:
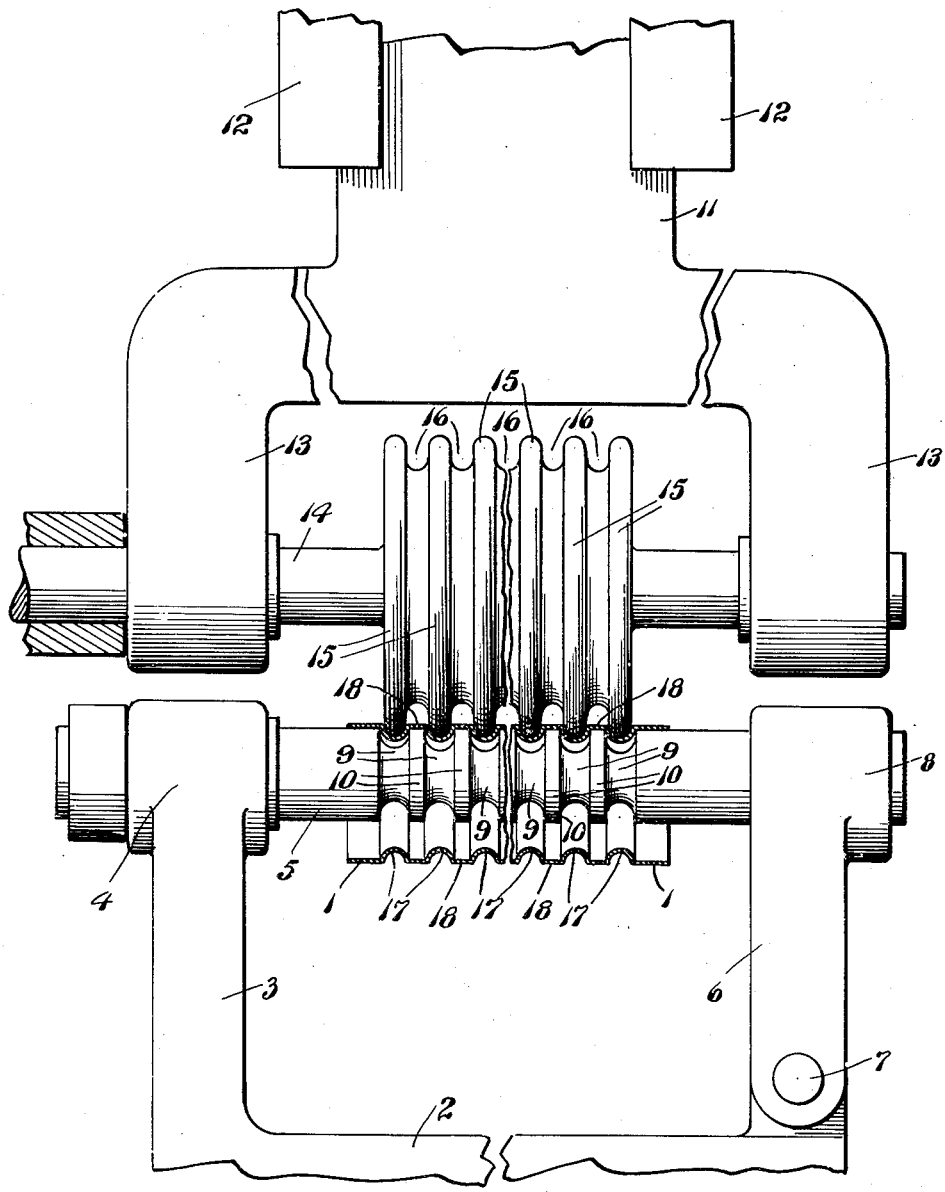
Figure 2:
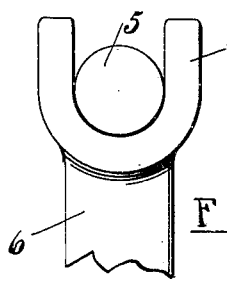
Fig. 2 is a fragmentary end view of the pivoted support for the lower roller or mandrel of the machine.

The plain tube 1 may be produced in any desired manner being of thin metal, preferably brass, and of sufficient length that it may produce a bellows of the required number of folds. The machine to which this tube is first brought comprises as a part of its structure a rolling head including a base 2 from which a vertical post 3 extends at one end, terminating in a bearing 4 at its upper end through which the mandrel 5 passes and in which it is rotatably mounted. The mandrel extends over the base 2 and at its opposite end is adapted, while the rolling operation is in progress, to be supported by a post 6 pivotally mounted near its lower end at 7 on said base 2 and bifurcated at its upper end to form a socket 8, open at its upper side in which the opposite end of the mandrel 5 may be seated and have bearing.

The mandrel 5 between its ends is formed with a consecutive series of spaced apart grooves 9 separated by narrower ribs 10, the diamter of which is the same as the diameter of the mandrel 5. The tube 1 when placed over this mandrel bears against said ribs at their upper sides, the end portion of the tube extending beyond the grooves bearing against the upper side of the end portions of the mandrel 5.

Above the mandrel a vertically movable head 11 is mounted between vertical guides 12. Head 11 at its lower end is formed with two spaced apart downwardly extending arms 13 having aligned bearings at their lower ends in which the upper roller or mandrel 14 is rotatably mounted. This upper roller or mandrel, between its ends and between the arms 13, is formed with an enlarged section considerably larger in diameter than the diameter of the end portion of said mandrel which is grooved annularly at spaced apart points, making a consecutive series of spaced apart annular ribs 15 separated by grooves 16. The ribs 15 are located directly above the grooves 9 in the lower mandrel and are of less width than the diameter of the grooves 9, while the grooves 16 are located directly over the flanges 10 and are of greater width than the width of said flanges.

The mandrel 14 is driven in any suitable manner. When it is desired to perform the first operation on the thin metal tube 1 the movable post 6 is turned about its pivot 7, as shown in Fig. 3, and the plain tube 1 placed over the mandrel 5 after which the post 6 is returned to position to support the free end of the mandrel. Head 11 having been elevated to permit the tube 1 to pass over the mandrel 5, it may then be lowered. The upper mandrel 14 being rotated, when the ribs 15 come against the metal of the tube 1 at its outer sides, annular grooves 17 are formed in the tube, the same being pressed inwardly toward the axis of the tube and partly into the grooves 9 of the lower mandrel. The connecting portions 18 between the grooves 17 remain unchanged and the same diameter as the tube 1, as is obvious. The grooves 9 and 16 in the mandrels are of such depth that the metal in the grooves 17 in the tube is not forced inwardly a distance sufficient to reach the bottoms of the grooves nor does the metal in the connecting sections 18 reach the bottoms of the grooves 16.

When the grooves 17 are formed in tube 1, inasmuch as the diameter of the tube at such point is decreased, there is a tendency to increase thickness of the metal to compensate for the decreased length which the metal occupies. At the same time the length of the section of metal of the tube which has been formed into a groove has been increased thereby neutralizing the tendency of the metal to thicken due to the decrease in diameter. It is evident, accordingly, that on pressing the grooves inwardly from a plain tube a much more uniform article may be produced than if the pressure of metal was outward, as an outward stretching of the metal stretches the metal because of the enlargement in diameter and also stretches it because of elongation, the result being cumulative, while in our method the stretching of the metal on account of elongation is compensated for by its tendency to thicken on account of its decrease in diameter; and the grooved tube produced in this first operation has the metal substantially uniform in thickness at all points as a result.

The tube will now be provided with a series of spaced apart inwardly extending grooves 17 connected by connecting sections 18 having a diameter of the original tube. The tube is now ready for the succeeding operations of the method. Each groove 17 is pressed farther inward and narrowed by the action of narrower corrugating die and matrix rollers 19 and 20 mounted on shafts 21 and 22, respectively, as illustrated in Fig. 4. The matrix roller 20 consists of two spaced apart annular flanges separated by a deep groove. The die roller is narrower than the groove in the matrix roller and entering a groove 17 in the tube, presses said groove 17 into the groove of the matrix roller but its movement is stopped prior to any contact of the inner side of the groove 17 with the bottom of the groove in the matrix roller. The flanges of the matrix roller act against the iner sides of the unworked connecting sections 18, one at each side of the groove 17 operated upon, whereby said connecting sections are bent and stretched into corrugations 24, the groove 17 having been formed into an intermediate corrugation 23. This step is repeated with successive sets of rolls of narrower widths, and matrix rollers having narrower flanges and deeper grooves, till the bellows, indicated at 25 in Fig. 5, has been completed with alternate inner and outer corrugations 23ᵃ and 24ᵃ.

A bellows formed in accordance with the above described process is capable of longitudinal expansion and retraction, and as the grooved portions 17 first formed in the plain tube have been worked beyond their elastic limit to a greater extent than the unworked annealed sections 18 of the tube, the inner corrugations possess greater temper and toughness than the outer corrugations at and approaching the bends therein. A bellows having the same diameter as the bellows shown in Fig. 5 can be made by an old process, first pressing outwardly, in a plain tube, spaced apart corrugations with connecting portions between, but the tube must be of a smaller diameter than the tube used in our process. As a result the metal will have to be stretched at the bends of the outer corrugations more than with the herein process described, with a greater departure from uniformity of thickness of the metal comprising the finished bellows. Also such bellows made by first stretching outwardly projecting corrugations from the wall of the plain tube and then finished by use of successive corrugating rollers will have greater temper at the bends of the outer corrugations than at the bends in the inner corrugations. Due to this combination of results the bellows made in accordance with the method herein described is more durable, has longer life and will sustain a far greater number of longitudinal elongations and retractions without rupture.

Bellows for gasoline pumps made according to the herein described process, being subjected to heavy duty and to repeated and continual longitudinal elongation and retraction, may be made without annealing the tube at any step of the process; or under certain conditions the tube might be partially annealed at different stages between the various operations thereon so as to leave portions of the temper at the sections of the tube worked beyond its elastic limit, there always being an excess of temper at and adjacent the bends of the inner corrugations. Bellows may also be produced by this process wherein complete annealing of the tube may take place at one or more times between different operations. For bellows to be used in thermostats controlling the flow of water in automobile radiators, the number of longitudinal elongations and retractions of the bellows during the lifetime of the automobile is comparatively small, not over a few thousand compared to hundreds of thousands or millions when used with the fuel pump. In such case the bellows may be annealed several times during the process of operation for ease in working the metal as temper to the same extent is not required for bellows of this character. But the method followed except for annealing will be the same and in all cases the uniformity of thickness of the metal to a greater degree will be attained.

A further advantage of the present process is that for the production of a bellows of predetermined size a plain tube of larger diameter is used then where the first operation of the tube consists in forcing outwardly broad and shallow corrugations. For this reason, if desired, a thinner tube can be used as the amount of metal in the tube of larger diameter will be the same as that of a somewhat thicker tube of smaller diameter.

It is to be understood that the mechanism described is diagrammatical and illustrative only of one form of mechanism which may be used to practice the process. Other specific mechanisms for providing the initial inwardly pressed spaced apart grooves in the plain tube may be used and it is of course apparent that the matrix and die rollers shown in Fig. 4 may be used with the matrix roller inside of the tube and the die roller outside as shown or this position of the two rollers reversed; or in a part of the operations the die roller may be on the outside and the matrix roller on the inside of the tube and in the other operations the matrix roller on the inside and the die roller on the outside, without departing from our invention or losing the advantages thereof.

We claim:

1. The process of making bellows consisting in providing a tube of thin metal, forming a series of inwardly pressed spaced-apart annular grooves in and around said tube with flat connecting sections of said tube between said grooves, and then acting upon said grooved tube with rolling operations to form it into a flexible longitudinally expansible and contractible bellows.

2. The process of making bellows consisting in providing a plain elongated tube having a thin wall, rolling a series of spaced-apart inwardly extending annular grooves with unworked and unchanged connecting sections of said tube between the grooves having the form and diameter of said tube, and then subjecting said grooves and connecting sections to additional rolling operations to inwardly deepen and narrow the grooves and outwardly extend and narrow said connecting portions.

3. The process of making bellows consisting in providing a plain elongated tube having a thin wall, forming a series of spaced-apart inwardly extending annular grooves therein with uncorrugated connecting sections of said wall between the grooves, and then subjecting said grooves and connecting sections to additional rolling operations to inwardly deepen and narrow the grooves and outwardly extend and narrow said connecting portions.

4. The process of making bellows consisting in providing a tube of thin metal, forming a series of inwardly pressed spaced-apart annular grooves in and around said tube with flat connecting sections having the diameter of the tube between said inwardly pressed grooves, and then subjecting said grooved tube to a successive series of additional rolling operations, each of which inwardly deepens, corrugates and narrows said grooves and outwardly extends, corrugates and narrows said connecting portions.

5. The process of making bellows consisting in providing a thin walled metal tube, rolling the metal of the tube inward to form grooves with flat connecting portions having the same diameter as the tube between said grooves, reducing the radius of curvature of the bends of said grooves and deepening the same, and simultaneously forming said flat connecting portions into outwardly extending corrugations and enlarging the diameter of the same by a rolling operation.

6. The process of making bellows consisting in providing a thin walled metal tube, rolling a consecutive series of spaced-apart grooves inwardly in said tube toward the axis of the tube with flat unworked connecting portions of the tube between said grooves, then deepening and narrowing said grooves and simultaneously forcing said connecting portions outwardly and narrowing the same, and thereafter subjecting said grooves and connecting portions to successive rolling operations to further deepen and narrow the grooves and further narrow and force said connecting portions outwardly.

In testimony whereof we affix our signatures.

EDGAR J. LEACH.
WALTER C. LAGERMAN